United States Patent
Chundury et al.

(10) Patent No.: US 7,307,125 B2
(45) Date of Patent: Dec. 11, 2007

(54) THERMOPLASTIC OLEFIN COMPOSITIONS AND INJECTION MOLDED ARTICLES MADE THEREOF

(75) Inventors: Deenadayalu Chundury, Newburgh, IN (US); Christopher J. Brenner, Evansville, IN (US); William R. Temme, Evansville, IN (US)

(73) Assignee: Ferro Corporation, Cleveland, OH (US)

( * ) Notice: Subject to any disclaimer, the term of this patent is extended or adjusted under 35 U.S.C. 154(b) by 37 days.

(21) Appl. No.: 11/012,897

(22) Filed: Dec. 15, 2004

(65) Prior Publication Data

US 2006/0128860 A1    Jun. 15, 2006

(51) Int. Cl.
*C08L 23/10* (2006.01)
*C08K 3/34* (2006.01)

(52) U.S. Cl. ............... 525/240; 524/451; 524/584; 524/579

(58) Field of Classification Search ............ 525/240; 524/451, 584, 579
See application file for complete search history.

(56) References Cited

U.S. PATENT DOCUMENTS

| | | | |
|---|---|---|---|
| 5,106,696 A | 4/1992 | Chundury et al. | 428/517 |
| 5,264,280 A | 11/1993 | Chundury et al. | 428/330 |
| 5,321,081 A | 6/1994 | Chundury et al. | 525/98 |
| 5,360,868 A | 11/1994 | Mosier et al. | 525/89 |
| 5,723,527 A * | 3/1998 | Sadatoshi et al. | 524/451 |
| 5,747,592 A * | 5/1998 | Huff et al. | 525/191 |
| 5,969,027 A | 10/1999 | Chundury et al. | 524/436 |
| 5,985,973 A * | 11/1999 | Sumitomo et al. | 524/451 |
| 6,046,264 A | 4/2000 | Muller et al. | 524/407 |
| 6,245,856 B1 | 6/2001 | Kaufman et al. | 525/240 |
| 6,306,972 B1 * | 10/2001 | Ohkawa et al. | 525/240 |
| 6,441,081 B1 * | 8/2002 | Sadatoshi et al. | 524/451 |
| 6,593,005 B2 * | 7/2003 | Tau et al. | 428/516 |
| 6,620,891 B2 | 9/2003 | Yu et al. | 525/240 |
| 6,656,987 B2 | 12/2003 | Takashima et al. | 524/127 |
| 6,803,421 B2 * | 10/2004 | Joseph | 525/240 |
| 6,815,490 B2 * | 11/2004 | Seelert et al. | 524/451 |
| 2002/0039630 A1 * | 4/2002 | Rousselet et al. | 428/35.7 |
| 2004/0092631 A1 | 5/2004 | Joseph | 524/230 |
| 2004/0242776 A1 * | 12/2004 | Strebel et al. | 525/100 |
| 2005/0009991 A1 * | 1/2005 | Meka et al. | 525/240 |

OTHER PUBLICATIONS

KR 2004/099865 (Byun et al.), Dec. 2, 2004; abstract in English.*
STRUKTOL TR106 technical data sheet.*

* cited by examiner

*Primary Examiner*—Ling-Sui Choi
(74) *Attorney, Agent, or Firm*—Rankin, Hill, Porter & Clark LLP

(57) ABSTRACT

A thermoplastic polymer composition that exhibits substantially isotropic post injection molding shrinkage. The thermoplastic polymer composition includes a blend of highly crystalline polypropylene homopolymer, an ethylene-$C_{4\text{-}8}$ α-olefin plastomer and talc having a $D_{50}$ of about 2.0 μm or less. The thermoplastic polymer composition exhibits post injection molding shrinkage, low temperature impact strength and tensile strength that is similar to or better than relatively expensive engineering resins and blends. The thermoplastic polymer composition according to the invention is particularly useful for forming injection molded parts for motor vehicles.

8 Claims, No Drawings

THERMOPLASTIC OLEFIN COMPOSITIONS AND INJECTION MOLDED ARTICLES MADE THEREOF

BACKGROUND OF THE INVENTION

1. Field of Invention

The present invention relates to thermoplastic olefin compositions and injection molded articles made thereof. More particularly, the present invention relates to thermoplastic olefin compositions that exhibit substantially isotropic shrinkage properties when used to form articles by injection molding.

2. Description of Related Art

Thermoplastic olefin ("TPO") compositions are multiphase polymer blends that generally comprise a continuous polyolefin matrix phase having discrete domains of a discontinuous alpha-olefin copolymer elastomer rubber phase dispersed therein. TPO compositions undergo plastic flow when heated above the softening point of the continuous polyolefin matrix phase, which makes the TPO compositions particularly suitable for use in fabricating articles via injection molding processes. The continuous polyolefin matrix phase impart tensile strength and chemical resistance to injection molded articles formed of the blend, and the discrete domains of alpha-olefin copolymer elastomer rubber dispersed in the continuous polyolefin matrix phase impart flexibility and impact resistance to injection molded articles formed of the blend. TPO compositions are frequently used to fabricate injection-molded articles that are exposed to extreme changes in weather and temperature such as, for example, interior and exterior automotive parts (e.g., dashboard skins, airbag covers, bumper covers, exterior fascia, air dams and other trim pieces).

In some applications, TPO compositions can be used as a lower cost alternative to engineering resins such as acrylonitrile-butadiene-styrene ("ABS") rubber. Unfortunately, unlike ABS rubber, conventional TPO compositions tend to undergo significant post molding shrinkage, typically in the range of 1.0-2.0%. Moreover, the shrinkage behavior of most conventional TPO compositions is not isotropic, meaning that the amount of shrinkage differs between the longitudinal and transverse flow directions. Although this shrinkage behavior does not adversely affect the properties of the resultant injection-molded article, it does make the fabrication of articles with tight dimensional tolerances more difficult. Molds must be specifically fabricated to account for the shrinkage behavior of the particular TPO composition and injection molding conditions being used (e.g. the degree of cooling allowed prior to mold ejection) in order to yield a finished article within desired dimensional tolerances. This shrinkage problem is particularly troublesome where the manufacturer has incurred the expense to have molds fabricated for use with a particular TPO composition and molding process and subsequently desires to substitute a different TPO composition or alter the process (e.g. increase the cooling rate). The change in composition or process conditions may result in a changed degree of shrinkage, thus yielding parts that are out of dimensional tolerance.

Attempts have been made to use additives such as talc and other inorganic particulate materials to control the shrinkage problems associated with TPO compositions. Unfortunately, incorporation of an amount of talc and/or other inorganic particulate material effective to control the shrinkage behavior of TPO compositions generally leads to other problems such as a reduction in flexibility, a decrease in toughness and a degradation of the surface finish of the injection-molded article.

Another method of adjusting the shrinkage behavior of TPO compositions is to increase the amount of the alpha-olefin copolymer elastomer rubber component in the blend. This disadvantageously increases the cost of the TPO composition because the alpha-olefin copolymer elastomer is generally the most expensive component in the blend. It also can adversely affect the melt flow behavior of the TPO composition and can make dispersing the alpha-olefin copolymer elastomer rubber in the continuous polyolefin matrix phase more difficult.

BRIEF SUMMARY OF THE INVENTION

The present invention provides a thermoplastic polyolefin composition that exhibits substantially isotropic post injection molding shrinkage. The thermoplastic polyolefin composition comprises a blend of from about 10% to about 75% by weight of a highly crystalline polypropylene homopolymer, from about 15% to about 30% by weight of an ethylene-$C_{4-8}$ α-olefin plastomer, less than about 30% by weight of a propylene-ethylene impact copolymer, less than about 5% by weight of rubber, and from about 10% to about 40% by weight of talc having a $D_{50}$ of about 2.0 μm or less. The Thermoplastic polyolefin composition according to the invention exhibits post injection molding shrinkage in both a longitudinal flow direction and a transverse flow direction of less than 1.0%, and the ratio of the percentage of post injection molding shrinkage in the longitudinal flow direction to the percentage of post injection molding shrinkage in the transverse flow direction and is from about 0.6 to about 1.5. The thermoplastic polyolefin composition according to the invention is particularly useful for forming injection-molded parts for motor vehicles.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides thermoplastic polymer compositions that are particularly suitable for use in forming articles such as motor vehicle parts via injection molding. The thermoplastic polymer compositions according to the invention exhibit very little post injection molding shrinkage, and furthermore exhibit a substantially isotropic shrinkage behavior. The thermoplastic polymer compositions according to the invention provide excellent low temperature impact strength and high flexural modulus, which makes them particularly useful for forming injection molded parts for motor vehicles.

Thermoplastic polymer compositions according to the invention comprise from about 10% to about 75% by weight of a highly crystalline polypropylene homopolymer, from about 15% to about 30% by weight of an ethylene-$C_{4-8}$ α-olefin plastomer, less than about 30% by weight of a propylene-ethylene impact copolymer, less than about 5% by weight of rubber, and from about 10% to about 40% by weight of talc having a $D_{50}$ of about 2.0 μm or less. More preferably, the thermoplastic polymer compositions according to the invention comprise from about 25% to about 45% by weight of highly crystalline polypropylene homopolymer having a melt flow greater than 40 g/10 min as measured in accordance with ASTM D1238-04, from about 15% to about 30% by weight of an ethylene-octene plastomer, from about 10% to about 20% by weight of a propylene-ethylene impact copolymer, less than about 1% by weight of rubber, and from about 15% to about 35% by weight of talc having a $D_{50}$ of about 2.0 µm or less.

Highly Crystalline Polypropylene Homopolymer

As noted above, the thermoplastic polymer composition according to the invention comprises from about 10% to about 75% by weight, and more preferably from about 25% to about 45% by weight, of a highly crystalline polypropylene homopolymer. The number average molecular weight of the polypropylene homopolymer is preferably above about 10,000 and more preferably above about 50,000. Highly crystalline polypropylene homopolymers are well known to those skilled in the art and many are commercially available. Homopolymers having a melt flow greater than about 40 g/10 min as measured in accordance with ASTM D1238-04 are presently preferred. Homopolymers with flexural moduli in excess of 260,000 psi in accordance with ASTM D790-03 are preferred.

Ethylene-$C_{4-8}$ α-Olefin Plastomer

Also as noted above, the thermoplastic polymer composition also comprises from about 15% to about 30% by weight, or more preferably from about 15% to about 30% by weight, of an ethylene-$C_{4-8}$ α-olefin plastomer. The term "plastomer" refers to copolymers that exhibit some degree of crystallinity, which can be observed using differential scanning calorimetry ("DSC"). The term "plastomer" does not refer to rubbers or elastomers, which do not exhibit any crystallinity. Furthermore, plastomers tend to exhibit a plastic behavior rather than an elastic behavior at 25° C. At that temperature, rubbers or elastomers will deform and return to their original dimensions when the load is released. Plastomers, on the other hand, will deform but will not return entirely to their original dimensions when the load is released.

The presently most preferred ethylene-$C_{4-8}$ α-olefin plastomer for use in the invention is an ethylene-octene plastomer sold by DuPont Dow Elastomers under the ENGAGE® 8999 grade designation. Preferably, the octene content of the plastomer will be 40±5% by weight. Furthermore, such plastomers preferably exhibit a melt flow of less than about 5 g/min at 190° C./2.16 kg, which is provides the best low temperature impact properties.

Propylene-Ethylene Impact Copolymer

Also as noted above, the thermoplastic polymer composition also comprises less than about 30% by weight, and more preferably from about 10% to about 20% by weight, of a propylene-ethylene impact copolymer. Propylene-ethylene impact copolymers are crystalline polymers that exhibit high stiffness and excellent impact strength at temperatures well below freezing. Such impact copolymers, which are available from a variety of suppliers, preferably contain 17.5±7.5% by ethylene by weight and can have a wide range of melt flow indicies.

Rubber

The thermoplastic polymer compositions according to the invention comprise less than about 5% by weight, and more preferably less than about 1% by weight, of rubber, which can be defined as a diene copolymer that is generally vulcanized for optimum physical properties. Most preferably, the thermoplastic polymer compositions are completely free of any rubber or elastomers.

Talc

The thermoplastic polymer compositions according to the invention comprise from about 10% to about 40% by weight, and more preferably from about 15% to about 35% by weight, of talc. The talc preferably has a $D_{50}$ of about 2.0 µm or less. Talc having a $D_{50}$ of less than about 1.5 µm and a top size of less than 8.0 µm is most preferred. Talc having a larger $D_{50}$ tends to produce greater shrinkage, which remains isotropic. The talc need not be specially treated for use in the invention.

Nucleating Agents

The present invention also preferably comprises one or more nucleating agents. Nucleating agents help stiffen the composition by promoting crystallization of the polypropylene after molding. Polypropylene normally forms crystals larger than the wavelength of light. Nucleating agents induce the formation of smaller spherulites that scatter less light. Additionally, the crystals form faster, so the polymeric composition solidifies faster and cooling time is reduced.

Conventional nucleating agents consist mainly of aromatic carboxylic acid salts, of which sodium benzoate is the most common. However, the preferred nucleating agents for use in the thermoplastic polymer compositions according to the present invention are organic derivatives of dibenzylidene sorbitol (DBS) such as can be purchased from Ciba Specialty Chemicals under the IRGACLEAR® brand designation. Preferably, the loading of nucleating agent in the thermoplastic polymer composition according to the invention is less about 0.5% by weight.

Other Additives

The thermoplastic polymer composition according to the invention can further comprise one or more conventional additives used in thermoplastic olefin compositions such as antioxidants, metal deactivators, waxes and pigments. Applicants have determined that use of both an internal lubricant such as calcium stearate and an external lubricant such as ethylene bis-stearamide wax, unexpectedly improves the low temperature impact strength of the thermoplastic polymer composition. In the presently preferred embodiment of the invention, the thermoplastic polymer composition comprises from about 0.1% to about 0.5% by weight of ethylene bis-stearamide wax and from about 0.1% to about 0.5% by weight calcium stearate. A typical loading in the present composition is 0.25% by weight of ethylene bis-stearamide wax and 0.25% by weight of calcium stearate.

Production and End Use

The individual components comprising the thermoplastic polymer composition according to the invention can preferably be melt blended together in an extruder and extruded as strands, which are cooled in a water bath, dried and chopped to form pellets. The pellets can then be used in conventional injection molding equipment to form parts, such as parts for motor vehicles.

Conventional polypropylene compositions tend to exhibit substantial post injection molding shrinkage as compared to engineering resins such as polycarbonate and ABS materials. The primary explanation for this behavior is that polypropylene is a substantially crystalline polymer, whereas most engineering thermoplastics are substantially amorphous polymers. Crystalline polymers tend to shrink more than amorphous polymers, leading to a greater tendency for crystalline polymers to warp.

Furthermore, conventional polypropylene-containing blends tend to exhibit a substantially different degree of shrinkage in a longitudinal flow direction as compared to a transverse flow direction. This makes mold fabrication very difficult. It also makes it difficult to produce parts having tight tolerances.

The present invention overcomes the limitations of the prior art. Shrinkage is very small, typically less than about 1.0%. Moreover, it tends to be substantially isotropic, meaning that the amount of shrinkage in the longitudinal flow direction is very similar to if not exactly the same as the shrinkage in the transverse flow direction. This makes it substantially easier to prepare molds, and also to produce parts within very tight tolerances. The ratio of the percentage of post injection molding shrinkage in the longitudinal flow direction to the percentage of post injection molding shrinkage in the transverse flow direction and is from about 0.6 to about 1.5, more preferably from about 0.7 to about 1.4, and even more preferably within the range of from about 0.8 to about 1.3. Optimally, the ratio of the percentage of post injection molding shrinkage in the longitudinal flow direction to the percentage of post injection molding shrinkage in the transverse flow direction is 0.9 to 1.2.

The relatively high loading of talc and highly crystalline polypropylene homopolymer in the thermoplastic polymer compositions according to the invention provides the composition with excellent flexural modulus, typically greater than about 275,000 psi as measured in accordance with ASTM D790-03. This flexural modulus value exceeds that which is attainable using ABS.

The thermoplastic polymer compositions according to the invention are particularly suitable for use in fabricating injection-molded parts for motor vehicles such as body trim pieces and interior pieces. Such articles exhibit excellent stiffness and impact strength. The parts are light, paintable and resistant to chemical degradation. Furthermore, the materials are resistant to weathering and exhibit excellent low-temperature impact resistance properties.

The following examples are intended only to illustrate the invention and should not be construed as imposing limitations upon the claims.

EXAMPLE 1

TPO Compositions A, B, and C were prepared by melt mixing the components shown in parts by weight in Table 1 below in a 2.5" single-screw extruder at 150 r.p.m. and extruding the melt-mixed material at 230° C. into strands having a substantially circular cross-section about ⅛" in diameter, which were passed through a water bath, air wiped and then cut into pellets about ¼" in length.

TABLE 1

|  | TPO-A | TPO-B | TPO-C |
|---|---|---|---|
| PRO FAX SG702 | 15 | 15 | 15 |
| 60 melt flow index polypropylene homopolymer | 39.2 | 33.5 | 28.5 |
| ENGAGE POE 8999 | 30 | 20 | 20 |
| Talc (2 micron particle size) | 15 | 30 | 35 |
| Polyethylene wax [Struktol TR-060] | — | — | 0.125 |
| TINUVIN 770 | — | 0.3 | 0.3 |
| IRGACLEAR D | — | 0.25 | 0.25 |
| CHIMMASORB 944 | — | 0.2 | 0.2 |
| IRGANOX B-225 | 0.2 | 0.2 | 0.2 |
| Bisphenol-A epoxy [metal deactivator] | 0.1 | 0.3 | 0.3 |
| Ethylene bis-stearamide wax | 0.25 | — | — |
| Calcium Stearate | 0.25 | 0.25 | 0.125 |

Note: PRO FAX SG702 is a high flow (18 MFI), high impact polypropylene copolymer resin available from Basell Polyolefins Company N.V. ENGAGE POE 8999 is an ethylene-octene copolymer elastomer available from DuPont Dow Elastomers. TINUVIN is bis(2,2,6,6,-tetramethyl-4-piperidyl)sebaceate available from Ciba Specialty Chemicals, Inc. IRGACLEAR D is a sorbitol based clarifying agent available from Ciba Specialty Chemicals, Inc. CHIMMASORB 944 is hindered amine light stabilizer available from Ciba Specialty Chemicals, Inc. IRGANOX B-225 is a thermal stabilizer consisting of a 50/50 blend of (tris(2,4-di-(tert)-butylphenyl)phosphite) and pentaerythritol tetrakis(3-(3,5di-tert-butyl-4-hydroxyphenyl)propianate) available from Ciba Specialty Chemicals, Inc.

A Toshiba 90-ton injection molding machine was used to injection mold TPC Compositions A, B and C into test bars for testing in accordance with ASTM Standards D256, D638, D790, D955 and D5420. The injection molding conditions were: 200° C. melt temperature; 50° C. mold temperature; 10 second injection time; and a 20 second cooling time. After molding, the test bars were kept at about 22.5° C. under about 50% humidity for 48 hours.

COMPARATIVE EXAMPLE 2

Pellets of high impact acrylonitrile-butadiene-styrene resin (Bayer LUSTRAN 743) were used to form test bars using the same injection molding equipment and mold as used in Example 1. After molding, the ABS test bars were kept at about 22.5° C. under about 50% humidity for 48 hours.

EXAMPLE 3

The test bars produced in Example 1 and Comparative Example 2 were subjected to standardized testing, the results of which are reported in Table 2.

TABLE 2

| Test | Unit | TPO-A | TPO-B | TPO-C | ABS |
|---|---|---|---|---|---|
| Melt Flow | g/10 min | 20 | 20 | 13 | 2 |
| Notched Izod @ 23° C. | ft-lb/in | no break | 2.4 | 2.4 | 8.0 |

TABLE 2-continued

| Test | Unit | TPO-A | TPO-B | TPO-C | ABS |
|---|---|---|---|---|---|
| Gardner Impact @ 23° C. | in-lb | 230 | 185 | 155 | 202 |
| Tensile Strength | psi | 2,450 | 3,000 | 2,500 | 4,900 |
| Flexural Modulus | psi | 185,000 | 335,000 | 310,000 | 276,000 |
| Linear Shrinkage | in/in | 0.007 | 0.006 | 0.007 | 0.007 |
| Transverse Shrinkage | in/in | 0.007 | 0.007 | 0.008 | 0.007 |

Note: Melt Flow was determined in accordance with ASTM D1238-04 ("Standard Test Method for MELT Flow Rates of Thermoplastics by Extrusion Plastometer"). Notched Izod (@ 23° C. and @ −30° C.) was determined in accordance with ASTM Standard D256-03 ("Standard Test Methods for Determining the Izod Pendulum Impact Resistance of Plastics"). Gardner Impact (@ 23° C. and @ −30° C.) was determined in accordance with D5420-04 ("Standard Test Method for Impact Resistance of Flat, Rigid Plastic Specimen by Means of a Striker Impacted by a Falling Weight"). Tensile Strength was determined in accordance with ASTM D638-03 ("Standard Test Method for Tensile Properties of Plastics"). Flexural Modulus was determined in accordance with ASTM D790-03 ("Standard Test Methods for Flexural Properties of Unreinforced and Reinforced Plastics and Electrical Insulating Materials"). DTUL at 66 psi was determined in accordance with ASTM D648-01 ("Standard Test Method for Deflection Temperature of Plastics Under Flexural Load in the Edgewise Position").

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A thermoplastic polymer composition comprising:
   from about 25% to about 45% by weight of highly crystalline polypropylene homopolymer having a melt flow greater than 40 g/10 min as measured in accordance with ASTM D1238-04;
   from about 15% to about 30% by weight of an ethylene-octene plastomer;
   from about 10% to about 20% by weight of a propylene-ethylene impact copolymer;
   less than about 1% by weight of rubber; and
   from about 15% to about 35% by weight of talc having a $D_{50}$ of about 2.0 µm or less;
   wherein the thermoplastic polymer composition exhibits post injection molding shrinkage in both a longitudinal flow direction and a transverse flow direction of less than 1.0%, the ratio of the percentage of post injection molding shrinkage in the longitudinal flow direction to the percentage of post injection molding shrinkage in the transverse flow direction is from about 0.8 to about 1.3, and the thermoplastic polymer composition exhibits a flexural modulus of 275,000 psi or greater as measured in accordance with ASTM D790-03.

2. An injection molded part for a motor vehicle formed of the thermoplastic polymer composition according to claim 1.

3. A thermoplastic polymer composition consisting essentially of:
   from about 10% to about 75% by weight of a highly crystalline polypropylene homopolymer having a melt flow greater than 40 g/10 min as measured in accordance with ASTM D1238-04;
   from about 15% to about 30% by weight of an ethylene-$C_{4-8}$ α-olefin plastomer;
   less than about 30% by weight of a propylene-ethylene impact copolymer;
   less than about 1% by weight of rubber;
   a nucleating agent derived from sorbitol, provided the content of the nucleating agent does not exceed about 0.5% by weight of the thermoplastic polymer composition; and
   from about 10% to about 40% by weight of talc having a $D_{50}$ of about 2.0 µm or less;
   wherein the thermoplastic polymer composition exhibits post injection molding shrinkage in both a longitudinal flow direction and a transverse flow direction of less than 1.0%, and wherein the ratio of the percentage of post injection molding shrinkage in the longitudinal flow direction to the percentage of post injection molding shrinkage in the transverse flow direction is from about 0.6 to about 1.5.

4. The thermoplastic polymer composition according to claim 3 wherein the thermoplastic polymer composition exhibits a flexural modulus of 275,000 psi or greater as measured in accordance with ASTM D790-03.

5. The thermoplastic polymer composition according to claim 3 wherein the ethylene-$C_{4-8}$ α-olefin plastomer is an ethylene-octene plastomer.

6. The thermoplastic polymer composition according to claim 3 wherein the ratio of the percentage of post injection molding shrinkage in the longitudinal flow direction to the percentage of post injection molding shrinkage in the transverse flow direction is from about 0.7 to about 1.4.

7. The thermoplastic polymer composition according to claim 3 wherein the ratio of the percentage of post injection molding shrinkage in the longitudinal flow direction to the percentage of post injection molding shrinkage in the transverse flow direction is from about 0.8 to about 1.3.

8. A thermoplastic polymer composition consisting essentially of:
   from about 10% to about 75% by weight of a highly crystalline polypropylene homopolymer havirnz a melt flow greater than 40 g/10 min as measured in accordance with ASTM D1238-04;
   from about 15% to about 30% by weight of an ethylene-$C_{4-8}$ α-olefin plastomer;
   less than about 30% by weight of a propylene-ethylene impact copolymer;
   less than about 1% by weight of rubber;
   a nucleating agent derived from sorbitol, provided the content of the nucleating agent does not exceed about 0.5% by weight of the thermoplastic polymer composition;
   from about 0.1% to about 0.5% by weight of ethylene bis-stearamide wax;
   from about 0.1% to about 0.5% by weight calcium stearate; and from about 10% to about 40% by weight of talc having a $D_{50}$ of about 2.0 µm or less;

wherein the thermoplastic polymer composition exhibits post injection molding shrinkage in both a longitudinal flow direction and a transverse flow direction of less than 1.0%, and wherein the ratio of the percentage of post injection molding shrinkage in the longitudinal flow direction to the percentage of post injection molding shrinkage in the transverse flow direction is from about 0.6 to about 1.5.

* * * * *